United States Patent [19]

Holm

[11] 4,026,590
[45] May 31, 1977

[54] FOLDING BUMPER ARRANGEMENT

[76] Inventor: Alan F. Holm, 1809 Sixth St., White Bear Lake, Minn. 55110

[22] Filed: June 14, 1976

[21] Appl. No.: 695,418

[52] U.S. Cl. .................................. 293/73; 293/34; 298/1 R
[51] Int. Cl.² ........................................ B60R 19/02
[58] Field of Search ............. 293/34, 69 R, 70, 64, 293/73; 214/501, 502, 503, 77 R, 77 P; 298/17 R, 17 S, 17 B, 19 R, 22 R, 22 J, 23 R, 1; 296/23, 57

[56] References Cited

UNITED STATES PATENTS

| 2,683,545 | 7/1954 | Wood | 214/501 |
| 2,990,212 | 6/1961 | Nicastro | 293/34 |
| 3,421,793 | 1/1969 | Piocm | 298/17 R |
| 3,913,963 | 10/1975 | Persicke | 293/73 |

Primary Examiner—Trygve M. Blix
Assistant Examiner—D. W. Keen
Attorney, Agent, or Firm—Orrin M. Haugen

[57] ABSTRACT

A retractable rear bumper means for attachment to the rear of self-propelled dump trucks having boxes which overhang the rear axles and extend rearwardly thereof, with the bumper means being coupled to the frame of the box and arranged to fold upwardly upon initiation of the raising of the dump truck box to a raised dumping position. The bumper means includes a bumper bar which extends transversely across the rear of the dump truck and has a length which exceeds the inner tread width or span of the rear wheels of the truck, and linkage means are provided to retain the bumper bar in a normal stable distended disposition, and to raise the bumper bar in response to initiation of raising of the dump truck box. Linkage arms and means are provided for retaining the bumper bar in the lower disposition, and also retaining the bar in its upper retracted disposition during the dumping operation.

4 Claims, 18 Drawing Figures

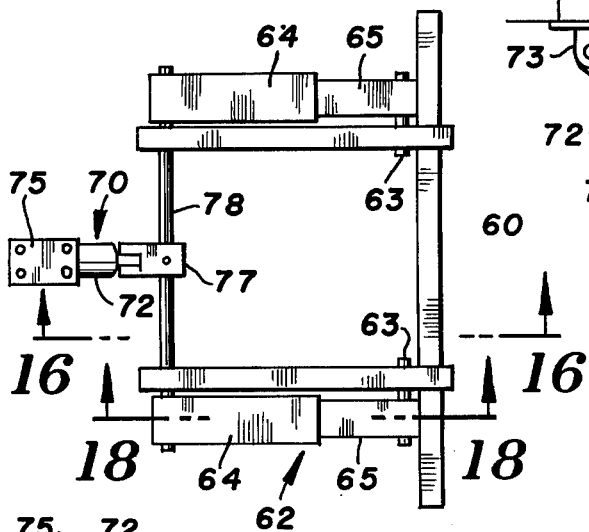
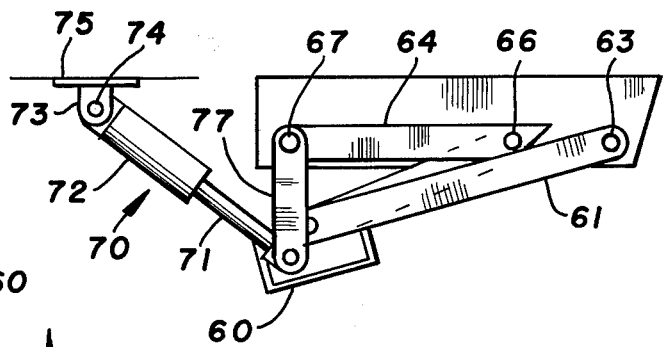
FIG.13
FIG.17
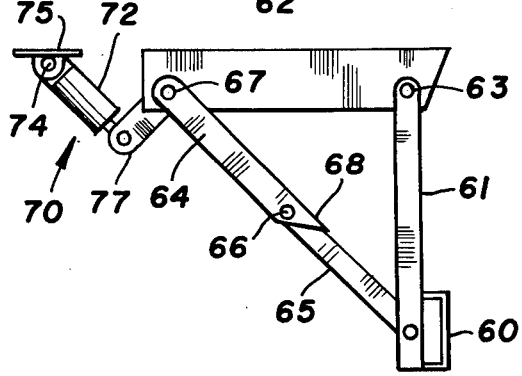
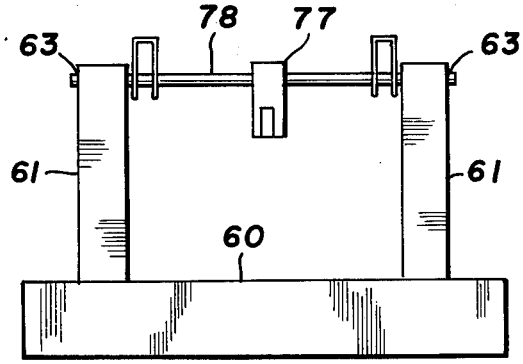
FIG.14
FIG.15
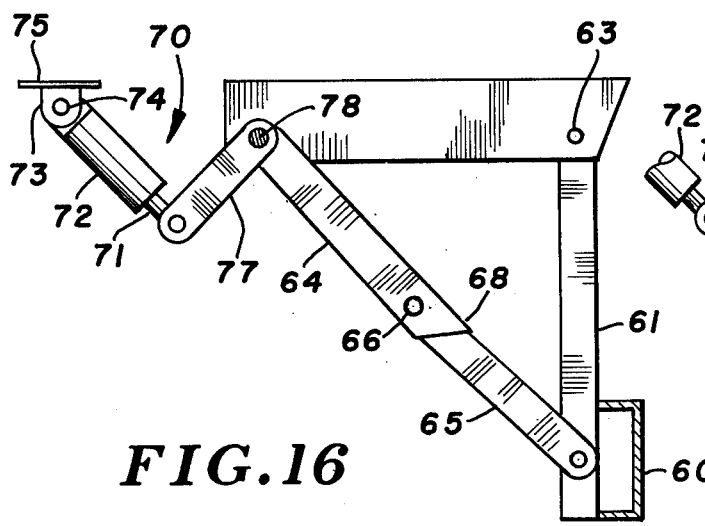
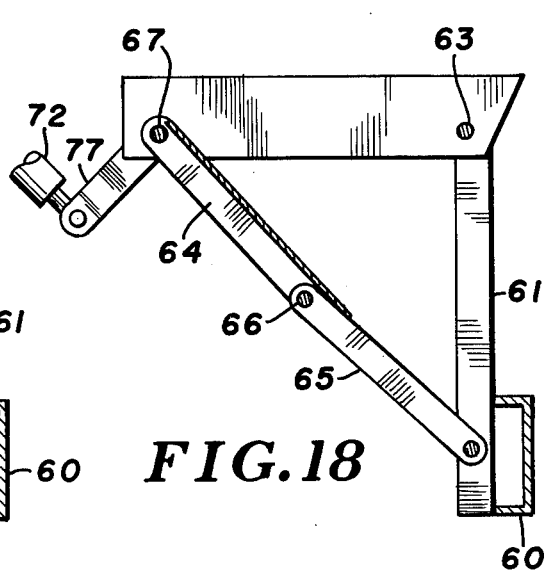
FIG.16
FIG.18

FOLDING BUMPER ARRANGEMENT

BACKGROUND OF THE INVENTION

The present invention relates generally to a retractable rear bumper means for attachment to the rear of self-propelled dump trucks and the like, particularly those dump trucks having boxes which overhang the rear axles and extend rearwardly thereof. These structures provide a hazard for rear-end collisions, particularly those in which the impact is moderate, and wherein the occupants of the rear vehicle involved in the rear-end collision are exposed to impact with the base of the box of the dump truck. In particular, rear-end collisions of this type expose the occupants of the oncoming rear vehicle to extremely hazardous conditions, since the oncoming vehicle frequently will find no significant abutment surface until the forward portion of the oncoming vehicle strikes the axle housing or rear wheels of the dump truck.

In the regulation of safety devices for self-propelled vehicles such as trucks and the like, means are frequently provided for having bumper bars disposed at the rear of a truck or other vehicle in order to protect occupants of vehicles which may become involved in rear-end collisions with the truck. Specifically, trucks which have conventional boxes do not present significant problems, inasmuch as the box is not raised or lowered during the normal operation of the vehicle. However, dump trucks present an unusual and exceptional problem inasmuch as the boxes of the dump truck are routinely raised and lowered during operation of the vehicle, and safety regulations frequently exempt this type of vehicle from the rear bumper requirement.

A particular problem exists in connection with self-propelled dump trucks which have boxes overhanging the rear axles of the vehicles. Such trucks are widely used in the conveying of a variety of items, but in particular in the conveying of trash and refuse. These vehicles are provided with extremely large boxes in order to accommodate the load requirements, and in order to achieve the volume necessary in the vehicle, the boxes will frequently overhang the rear axle of the supporting vehicle. When arranged in overhanging relationship, upon dumping, the rear or tailgate portion of the truck will extend or pivot downwardly toward the ground, and in doing so would bend, break, or possibly destroy any bumper means which may be disposed thereacross. On the other hand, if such a bumper bar were arranged at a position which would not interfere with the normal dumping operation, such a bar would provide little if any protection for the occupants of oncoming vehicles, since it would necessarily be disposed at a substantial elevation from the ground.

Mechanical bumper bars capable of only limited forward motion have been suggested, however such bars, unless provided with means for raising and lowering of the bumper bar would interfere with the normal use and driving of the dump truck vehicle, particularly upon backing of the vehicle in confined or crowded working areas. Accordingly, the present invention is one which permits the vehicle to be utilized with a total degree of flexibility in its operation, without adversely affecting the normal operation, and yet provides significant protection for occupants of any vehicle involved in a rear-end collision with the dump truck wherein moderate forces or impacts are present.

SUMMARY OF THE INVENTION

Briefly, the bumper means of the present invention includes a retractable rear bumper which is arranged to be attached to a self-propelled dump truck, with the bumper means being operatively coupled to the frame of the truck box, and arranged to fold upwardly upon initiation of the raising operation of the box. The bumper includes a bumper bar means which is arranged to be held in a normal stable disposition resistant to forward motion upon application of forces from the rear, with the bumper bar extending transversely across the rear of the truck and having a length which exceeds the inner tread width span of the rear wheels of the truck. Linkage means are provided to retain the bumper bar in its stable disposition, and to also permit raising of the bar in response to initiation of raising of the dump truck box. Lifting arms are provided which are coupled to the bumper bar at the lower ends thereof, and are arranged for pivotal lifting of the bumper bar between the normal stable disposition and the retracted disposition. Hydraulic lifting means are coupled in circuit with the lifting cylinder of the dump truck box, the hydraulic lifting means having ram means for pivotally rocking the arms in an arcuate direction to lift the bumper bar from its normal disposition up to a retracted disposition to permit free raising of the dump truck to a dumping position. Thus, the bumper means of the present invention provides a stable and rigid impact bar to resist moderate impact forces upon the occurrence of a rear-end collision with another vehicle, while, at the same time, providing a convenient means for lifting the bumper means from the stable lowered disposition to a retracted disposition to permit normal raising of the dump truck box to a raised dumping position.

Therefore, it is a primary object of the present invention to provide an improved bumper means for self-propelled dump trucks having boxes which overhang the rear axles and extend rearwardly thereof, with the bumper means including a bumper bar which extends transversely across the rear of the dump truck, and has means for retaining the bar in a disposition resistant to forward motion upon application of force from the rear of the vehicle, and yet is provided with articulating mechanism for raising the bumper bar means upon initiation of the raising of the dump truck box.

It is yet a further object of the present invention to provide an improved retractable rear bumper means for attachment to the rear of self-propelled dump trucks having boxes which overhang the rear axles and extend rearwardly of the rear axles, wherein the bumper means includes a bumper bar which is arranged generally transversely across the rear of the dump truck, and which is provided with linkage means arranged to retain the bumper bar in a stable lowered operating disposition, and to raise the bumper bar in response to the initiation of the raising of the dump truck box, the linkage means further including hydraulic lifting means coupled in circuit with the lifting cylinder of the dump truck box.

Other and further objects of the present invention will become apparent to those skilled in the art upon a study of the following specification, appended claims, and accompanying drawings.

BRIEF DESCRIPTION OF THE DRAWINGS

FIG. 13 is a horizontal sectional view taken along the line and in the direction of the arrows 13—13 of FIG. 12;

FIG. 14 is a side elevational view of the retractable rear bumper means shown in de-mounted disposition, and illustrating the bumper bar in lowered normal running disposition;

FIG. 15 is a rear elevational view of the de-mounted foldable bumper means illustrated in FIG. 9;

FIG. 16 is a view similar to FIG. 14, but illustrating some of the linkage means in cut-away disposition so as to illustrate the functional operation thereof, with FIG. 16 being taken along the line and in the direction of the arrows 16—16 of FIG. 13;

FIG. 17 is a view similar to FIG. 14, but illustrating the lifting cylinder with its ram in extended disposition, and with the linkage mechanisms having raised the bumper bar from its normal disposition; and FIG. 18 is a view similar to FIG. 16, but taken along the line and in the direction of the arrows 18—18 of FIG. 13.

DESCRIPTION OF THE PREFERRED EMBODIMENT

Figure 1:
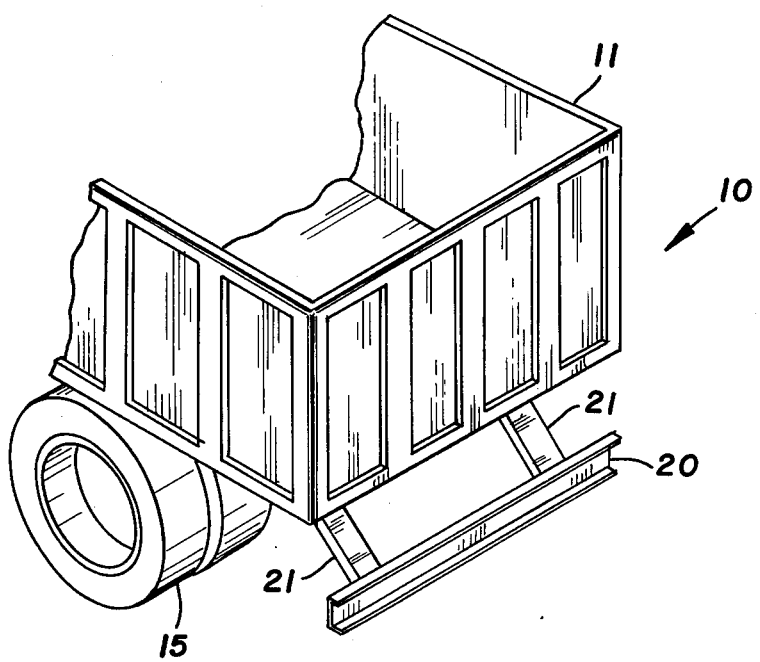
FIG. 1 is a fragmentary perspective view of the rear portion only of a dump truck vehicle having the folding retractable rear bumper means of the present invention attached to the rear thereof, and with the remaining portions of the dump truck vehicle being broken away.

In accordance with the preferred embodiment of the present invention, and as illustrated in FIGS. 1-8 of the drawings, the dump truck assembly generally designated 10 includes a dump truck box 11 which is mounted on a box frame 12, with the box and box frame being, in turn, pivotally secured to the chassis 13 of the vehicle, such as at the pivot linkage point 14. The dump truck vehicle is conventional, having tandem rear wheels 15—15, it being noted that the box 11 overhangs the rear axle 16 of the vehicle, and extends for a significant distance rearwardly thereof. The vehicle 10 is provided with a retractable rear bumper means generally designated 18, with the bumper means 18 being attached to the frame 12 of box 11 by mounting means which will be described more fully in detail hereinafter. The retractable rear bumper means 18 includes a bumper bar 20 which is arranged generally transversely across the rear of the dump truck, and extends, as indicated, across a length which exceeds the inner tread width or span of the vehicle, such as is illustrated in FIG. 1. The bumper bar 20 is suspended or otherwise coupled to the dump truck box by a linkage means which is arranged to retain the bumper bar in its normal or stable lowered disposition such as is illustrated in FIG. 1, with the linkage including a first pair of laterally disposed arms 21—21 which will, as more fully explained hereinafter, raise the bumper bar in response to the initiation of raising of the dump truck box.

Means are provided to retain the bumper bar in stable lowered disposition, and resistant to forward motion upon application of force to the rear of the vehicle. In this connection, the bumper bar is illustrated in its normal or stable disposition in FIG. 1, and is shown remaining in that disposition in FIG. 2. In FIG. 3, however, the bumper bar is shown in retracted disposition with the laterally disposed arms 21 having been pivoted about the forward or upper ends thereof, such as at 22, so as to raise the bar 20 to the disposition illustrated in FIG. 3.

The arms 21—21 are, as indicated, secured such as by welding or the like to the inner surface of the bumper bar, and at the lower ends of the arms 21—21. The upper ends of the arms 21—21, as indicated, are pivotally coupled as at 22 to a bracket 24 which is, as indicated, secured or otherwise coupled to the frame 12 of the box 11 by means of bolting, coupling or the like such as is illustrated at 25.

Figure 2:
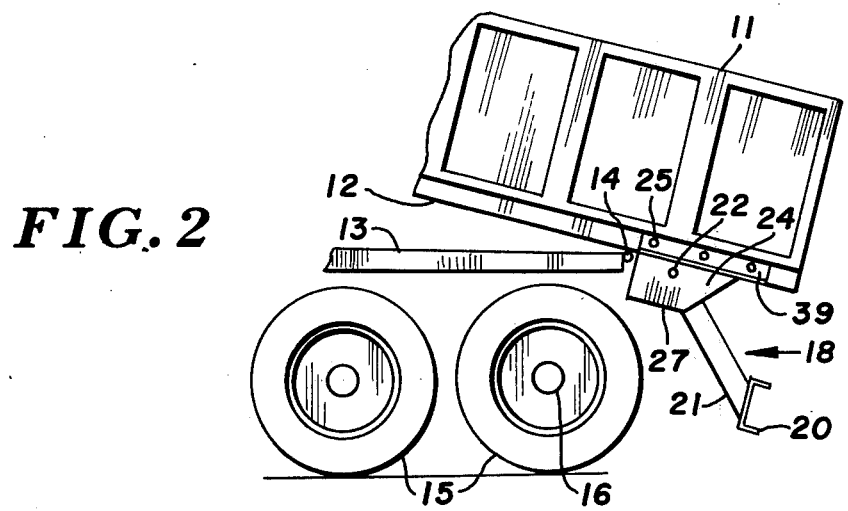
FIG. 2 is a fragmentary side elevational view of that portion of the dump truck vehicle illustrated in FIG. 1, and showing the disposition of the retractable bumper in its normal disposition, and prior to its being raised upon initiation of the raising of the dump truck box.
Figure 3:
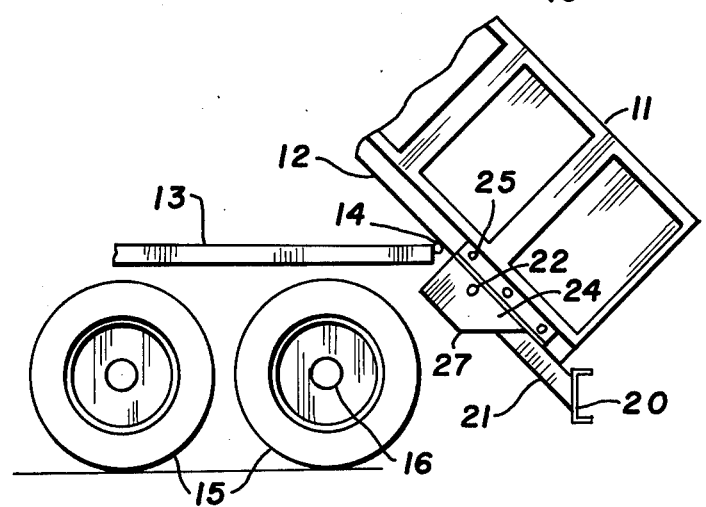
FIG. 3 is a view similar to FIG. 2, but illustrating the disposition of the retractable rear bumper means when the dump truck box has been raised, and the bumper means has been moved to its retracted disposition.
Figure 4:
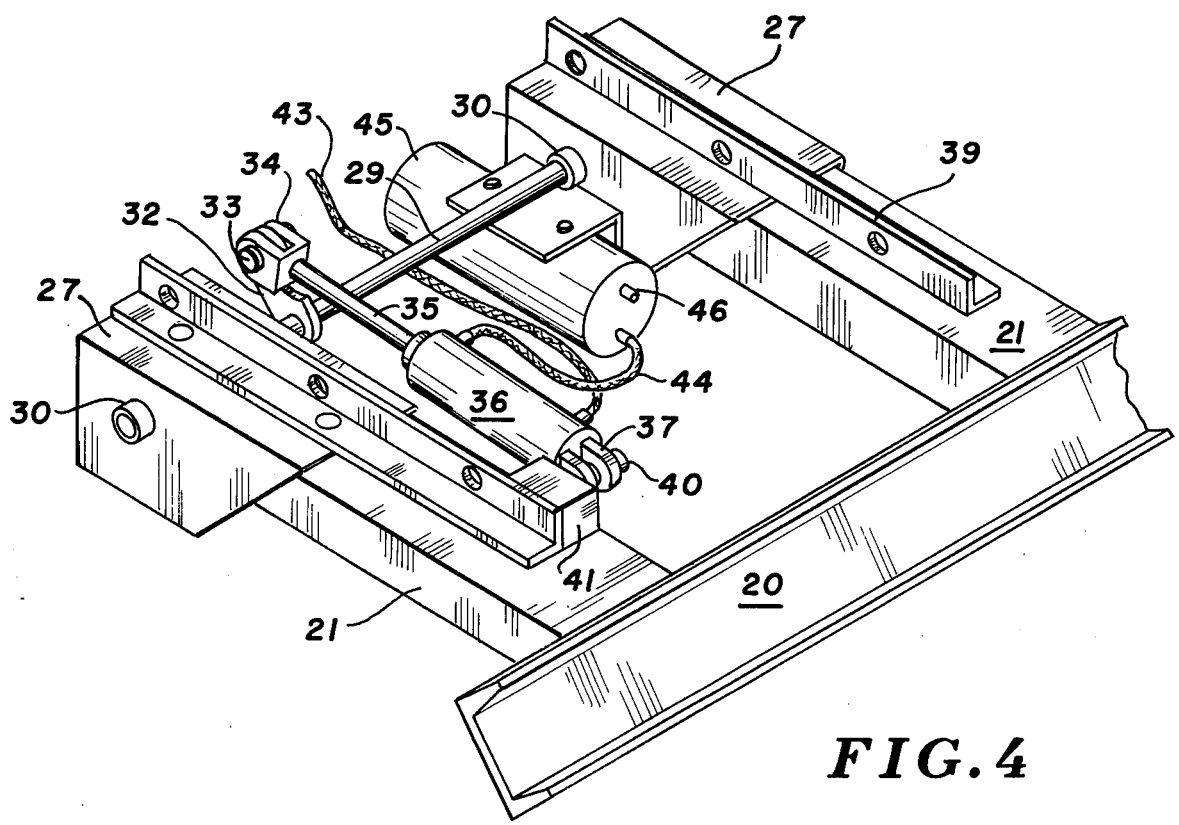
FIG. 4 is a detail perspective view, partially broken away, and illustrating the mechanism utilized to articulate the bumper bar means, and illustrating the bumper means in de-mounted disposition, or otherwise removed from the supporting truck vehicle.
Figure 5:
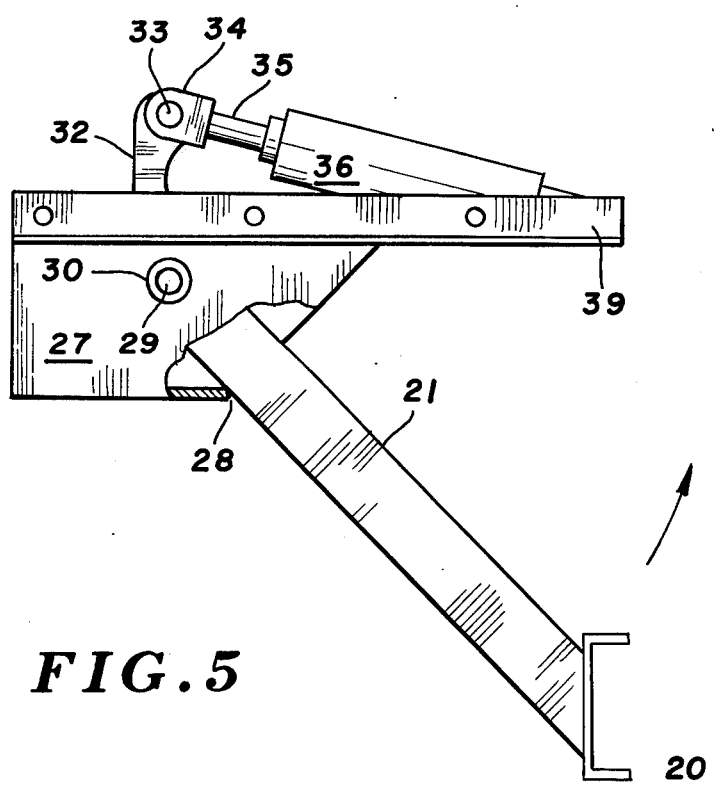
FIG. 5 is a side elevational view, partially in section and broken away, and illustrating the de-mounted foldable retractable rear bumper means in its normal extended disposition.

In order to retain the bumper bar in stable lowered disposition, the means which are provided to retain this disposition are illustrated in FIGS. 2, 4 and 5 wherein box member 27 is provided as an integral part or portion of bracket 24. Box member 27 has an edge abutment surface 28 which limits the downward or forward motion of arms 21—21, and thus suspends bumper bar 20 in its normal stable lowered disposition.

Attention is now directed to FIGS. 4 and 5 of the drawings wherein the bumper means is illustrated in de-mounted disposition. Specifically, pivotal coupling 22 includes actuating shaft 29 which is journaled for rotation in bushings 30—30 disposed in box members 27—27. In order to provide pivotal rotation for shaft 29, crank arm 32 is provided, with arm 32 having its free end coupled pivotally to pin 33 through fork member 34. Ram 35 of hydraulic cylinder 36 is used to drive arm 32 pivotally, thereby providing raising and lowering action to the bumper assembly. Cylinder 36 is mounted through its rear bracket 37 to the frame member 39, with the mounting of member 37 being, of course, pivotally about pin 40. Pin 40 is, of course, secured to frame 39 in a suitable fashion, particularly about the mounting block 41.

With ram 35 extended, bumper bar 20 is raised to its upper disposition, as illustrated in FIG. 4, and with cylinder 36 having ram 35 retracted, as illustrated in FIG. 5, the bumper bar 20 is permitted to fall to its stable disposition. Fluid line 43 is used to deliver hydraulic fluid under pressure to cylinder 36, as indicated, with the forward chamber portion of cylinder 36 being coupled to line 44. Line 44, in turn, leads to buffer cylinder or chamber 45 which is a closed chamber having approximately ½ of its volume filled with hydraulic fluid or oil. Air charging valve 46 is provided in order to deliver a charge of compressed air to the chamber area of tank 45, with approximately 80 pounds of pressure being provided for a total volume of approximately ½ gallon for tank 45. Hydraulic line 43 is, in turn, coupled directly to the lift cylinder for the dump truck box, and upon exposure to sufficient pressure, will cause ram 35 to extend, thereby raising bumper bar 20 is response to the initiation of the dumping of box 11. In lieu of the hydraulic reservoir and chamber of tank 45, a torsion spring may be utilized in generally coaxial relationship with shaft 29 in order to apply a constant biasing force urging bumper bar 20 and the supporting linkage in its stable lowered disposition. In such an arrangement, the hydraulic cylinder used would be of the single-acting type.

Upon dropping of box 11, bumper bar 20 will drop slowly by virtue of the restricted flow of fluid through line 43, with the structure obtaining an assist from the compressed volume of tank 45 by virtue of its charge of compressed air.

Figure 6:
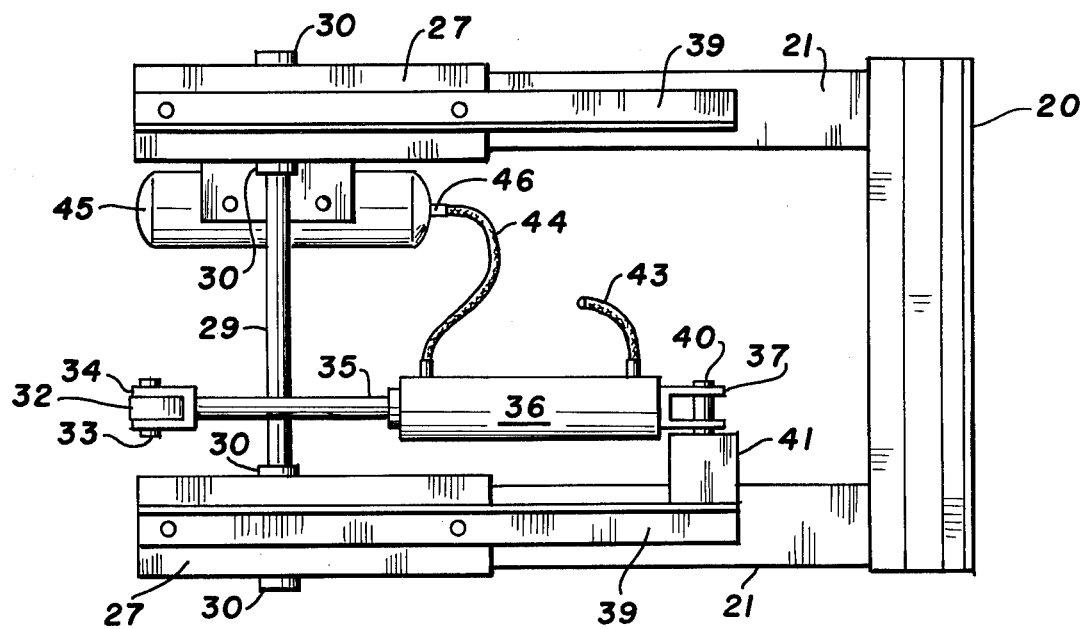
FIG. 6 is a top plan view of the de-mounted foldable rear bumper means, and illustrating the bumper bar in raised or retracted disposition.
Figure 7:
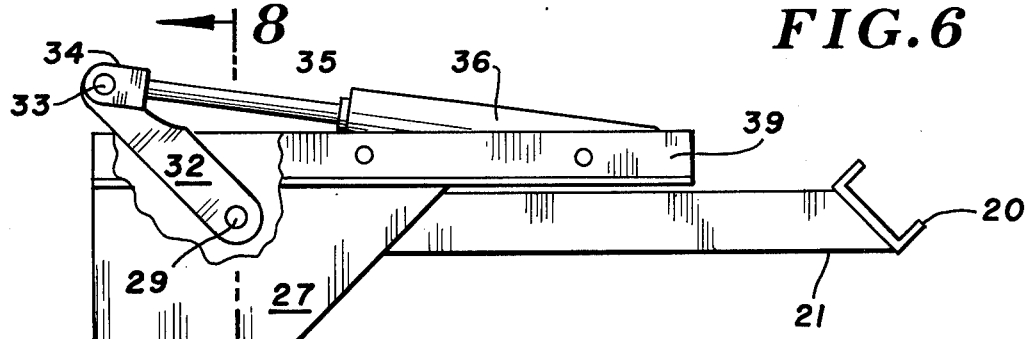
FIG. 7 is a view similar to FIG. 5, but illustrating other portions of the mechanism in broken away section, and furthermore illustrating the bumper bar in raised retracted disposition.
Figure 8:
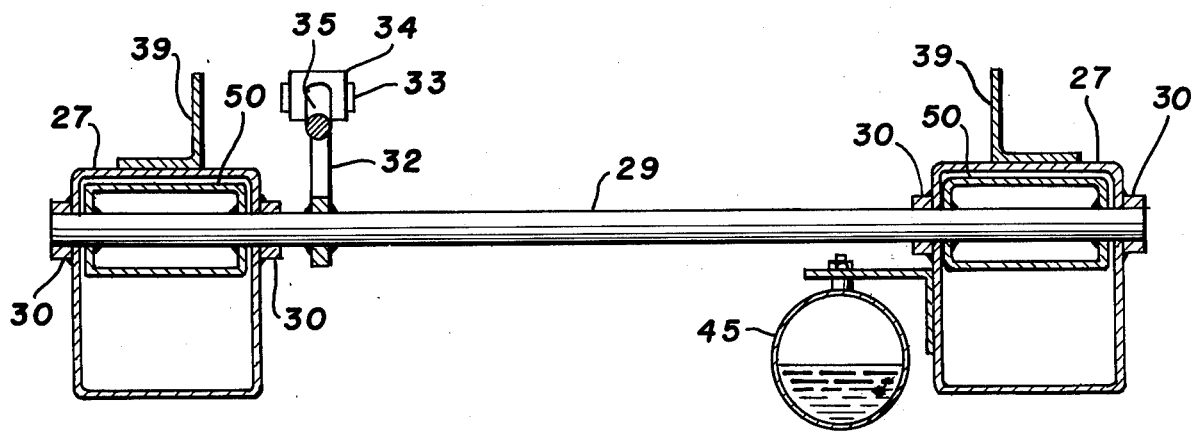
FIG. 8 is a vertical sectional view taken along the line and in the direction of the arrows 8—8 of FIG. 7.
Figure 9:
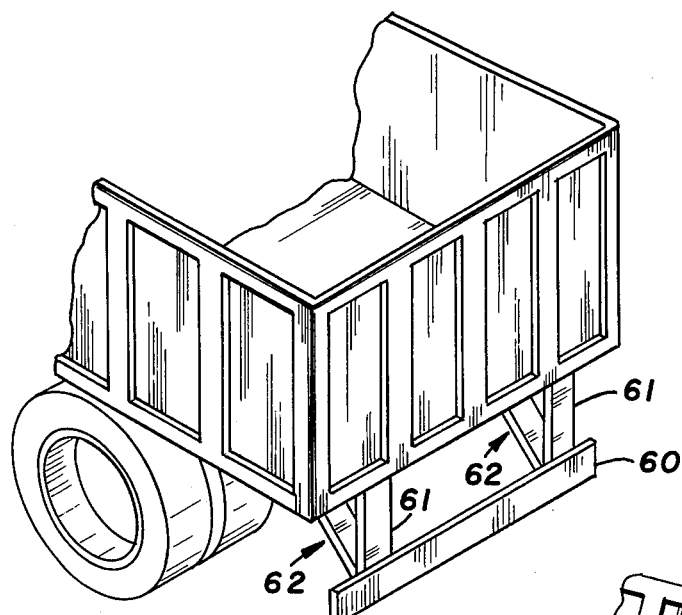
FIG. 9 is a fragmentary perspective view of the rear portion only of a dump truck vehicle having a modified form of the folding retractable rear bumper means of the present invention attached to the rear thereof, and with the remaining portions of the dump truck vehicle being broken away.
Figure 10:
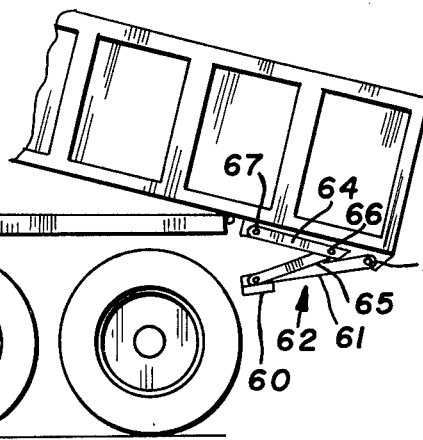
FIG. 10 is a fragmentary side elevational view of that portion of the dump truck vehicle illustrated in FIG. 9, and illustrating the retractable rear bumper means in raised disposition.
Figure 11:
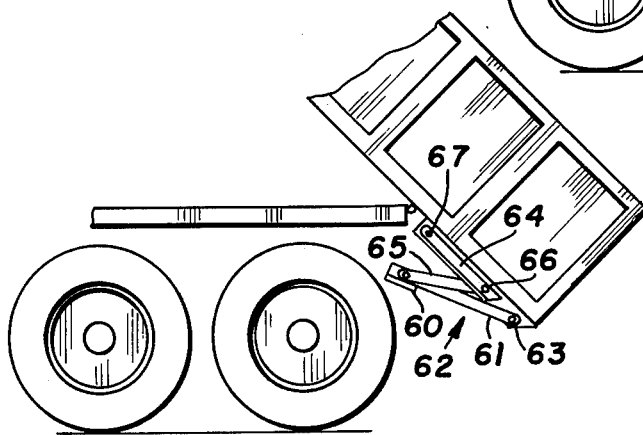
FIG. 11 is a view similar to FIG. 10, but illustrating the dump truck vehicle with the box in fully raised disposition.

The details of the operation of the system are further illustrated in FIGS. 6, 7 and 8. In these views, the arrangement is more clearly illustrated, including the means for securing arms 21 to shaft 29.

For example, arms 21—21 are secured to shaft 29 about closed box end 50 of arms 21—21. Furthermore, it will be observed that bushing 30 is, in turn, welded or otherwise secured to the surface of box member 27. Mounting bracket or framing bracket 39 is, in turn, secured to member 27 by any suitable means such as welding or the like.

Figure 12:
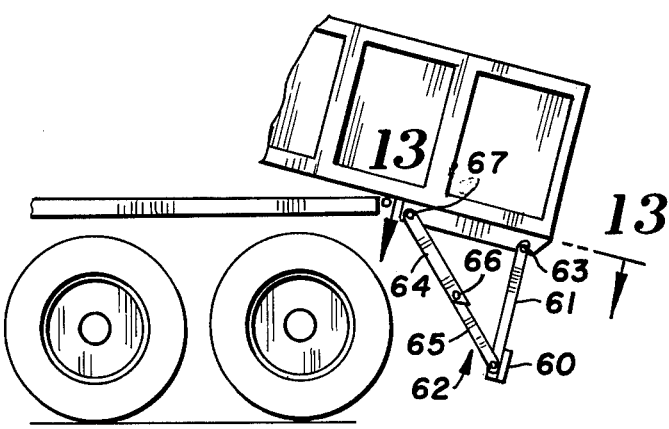
FIG. 12 is a view of that portion of the dump truck vehicle illustrated in FIGS. 10 and 11, and further illustrating the downward disposition of the retractable rear bumper means which is assumed upon lowering of the dump box toward its normal disposition.

Attention is now directed to FIGS. 9-18 wherein a further embodiment of the invention is illustrated. Specifically, bumper bar 60 is shown depending from mounting arms 61—61, with a pair of actuating link arms 62—62 being provided for articulating arms 61—61. Specificlly, arms 61—61 are firmly coupled or secured to the backing of bumper bar 60, as illustrated in FIG. 12, with the upper ends being pivotally mounted to the box frame as at 63. Arm 62 is formed of two independent or individual segments, with the segments being identified as segments 64 and 65. Segments 64 and 65 are pivotally coupled together at points adjacent the ends of each segment, as at 66, and thus upper segment 64 is coupled to lower segment 65 by virtue of the pivotal coupling member or pin 66. Upper segment 64 is secured to the box frame pivotally as at 67.

Means are provided to resist the forward pivotal motion of the link means 62—62. Specifically, upper segment 64 is formed as a channel member or box member, preferably a box member, with an angularly extending overhanging portion being provided as at 68 (see FIG. 14), with area 68 being provided to resist forward pivotal movement of arms 62—62. It will be appreciated, of course, that two arms 62—62 are provided, one at each lateral end of the bar 60.

In order to lift the bumper assembly illustrated in FIGS. 9-18, lifting cylinder generally designated 70 is provided, with cylinder 70 having ram 71 extending therefrom. The body portion of cylinder 70, such as at 72, is mounted to mounting ears 73 through pin 74, with mounting ears 73 being secured, as indicated, to the box frame, as indicated at 75. Upon retraction of cylinder 70, that is, retraction of ram 71 into body 72, the stable riding or normal disposition is provided, as illustrated in FIG. 14. Upon extension or expansion of ram 71 from cylinder 70, link arm 77 is actuated or rotated in a counter-clockwise direction about shaft 78. Since upper arm segment 64 is also keyed to shaft 78, arm segment 64 is raised to the disposition illustrated in FIG. 17, whereupon bumper bar 60 is raised correspondingly to the position illustrated in FIG. 17.

Upon being exposed to a force in the forward direction, particularly a force moving from right to left as viewed in FIGS. 14 and 16 and 18, the overhanging portion 68 of arms 62—62 resists the forward or clockwise motion of arms 61—61, and thereby resists any impact when delivered. Of course, the arrangement is provided for resisting moderate impact forces, and is not designed to resist exceptional or heavy impacts. The structure is limited only by virtue of its own structural strength, and hence it will be appreciated that moderate forces may be encountered and resisted by the arrangement illustrated in FIGS. 9-18 inclusive.

It will be appreciated that various modifications may be made of the structure and that these modifications will frequently reside within the reasonable interpretation of the substance of embodiment illustrated in either FIGS. 1-8 or 9-18.

I claim:

1. Retractable rear bumper means for attachment to the rear of self-propelled dump trucks having boxes which overhang the rear axles and extend rearwardly thereof with the retractable bumper means being coupled to the frame of said dump truck box and arranged to be disposed in normal stable disposition resistant to forward motion upon application of force from the rear thereof and being arranged to fold upwardly upon initiation of the raising of the dump truck box to a raised dumping position; said bumper means comprising:
   a. bumper bar means arranged to extend generally transversely across the rear of a dump truck and having a length which exceeds the inner tread width span of the rear wheels of said truck;
   b. linkage means arranged to retain said bumper bar in said normal stable disposition and to raise said bumper bar in response to the initiation of raising of said dump truck box, said linkage means comprising:
      1. a pair of laterally disposed first arms secured to said bumper bar at the lower ends thereof and being pivotally coupled to said dump truck box frame along the base of said box and generally between the rear axle on the rear of said dump truck box for pivoting of said bumper bar between said normal disposition and said retracted disposition;
2. abutment means for restraining the pivoting of said first arms beyond the point of said stable normal disposition; and
3. hydraulic lifting means coupled in circuit with the lifting cylinder of said dump truck box and having ram means for pivotally rocking said first arms in an arcuate direction to lift said bumper bar from said normal disposition to said retracted disposition in response to the flow of hydraulic fluid from said lifting cylinder.

2. The retractable rear bumper means as defined in claim 1 being particularly characterized in that said pair of first arms are secured at their upper ends to a lifting shaft adapted for pivotal rotation relative to said dump truck box frame.

3. The retractable rear bumper means as defined in claim 1 being particularly characterized in that means are provided for applying a return force to said bumper bar from retracted disposition to normal disposition.

4. The retractable rear bumper means as defined in claim 1 being particularly characterized in that said abutment means for restraining pivoting of said first arms is an edge surface of an abutment channel.

* * * * *